June 5, 1928. 1,672,118
A. FRASER
ROLL AND LIKE BEARINGS FOR RUBBER GRINDING, MIXING, WASHING, CALENDERING OR OTHER MACHINES
Filed Jan. 7, 1926 2 Sheets-Sheet 1
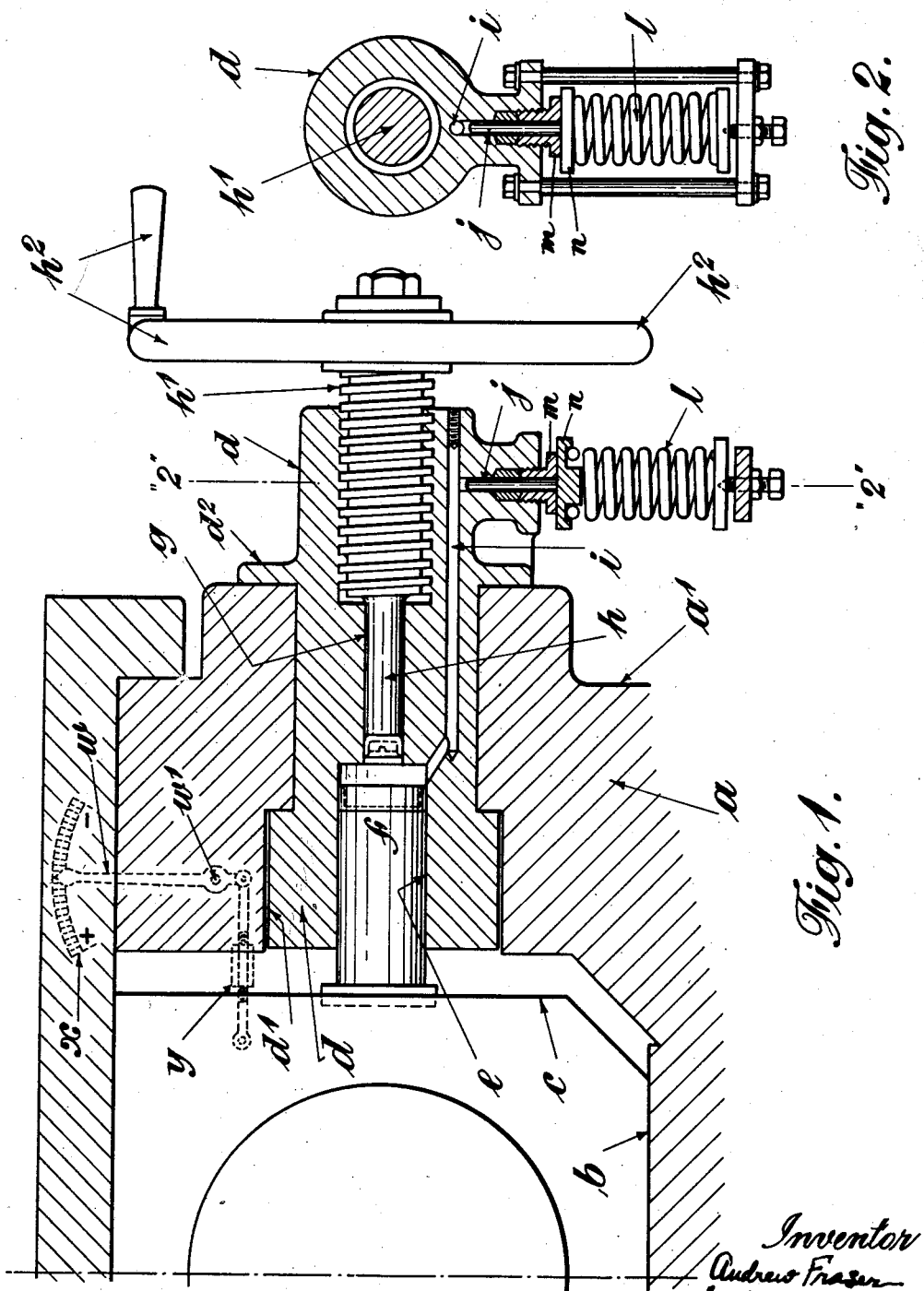

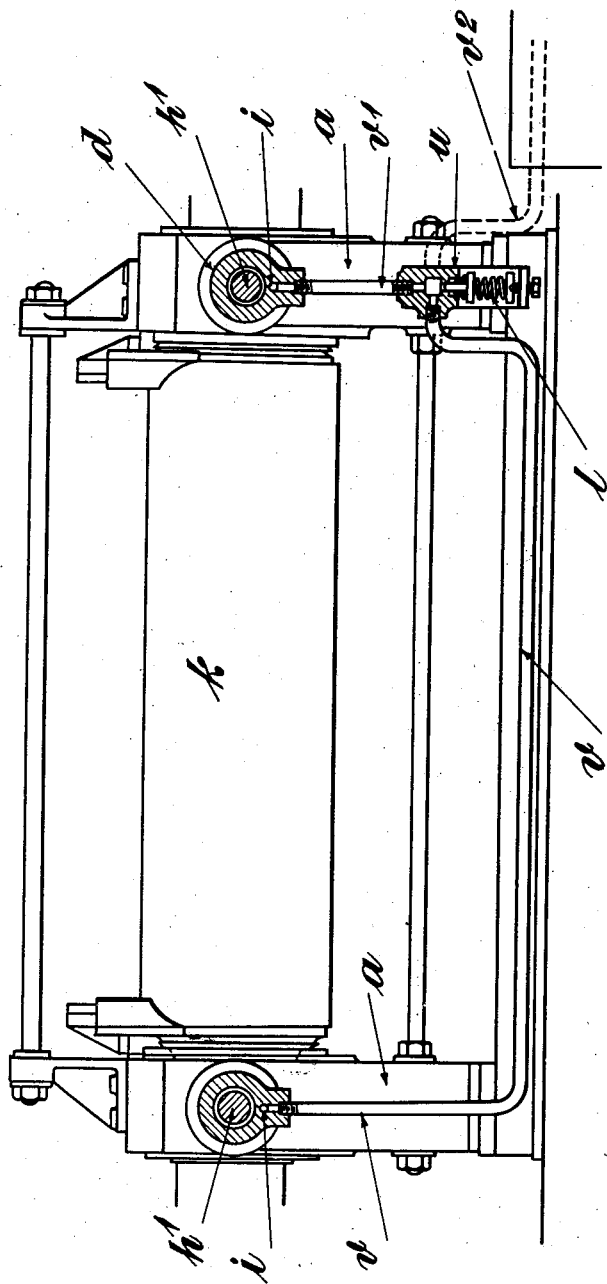

Patented June 5, 1928.

1,672,118

UNITED STATES PATENT OFFICE.

ANDREW FRASER, OF CROYDON, ENGLAND, ASSIGNOR TO RISSIK FRASER AND COMPANY LIMITED, OF CROYDON, ENGLAND, A BRITISH COMPANY, AND FRANCIS SHAW AND COMPANY LIMITED, OF BRADFORD, ENGLAND, A BRITISH COMPANY.

ROLL AND LIKE BEARINGS FOR RUBBER GRINDING, MIXING, WASHING, CALENDERING, OR OTHER MACHINES.

Application filed January 7, 1926, Serial No. 79,770, and in Great Britain January 9, 1925.

The invention relates to journal bearings and whilst primarily directed to the roll bearings of rubber working machines, such as grinding, mixing, washing and calendering machines is also adapted for use with other machines.

In grinding, mixing, washing and like machines, as used in the treatment or manufacture of rubber, wherein the plastic material is passed between rolls, it is usual to adjust the rolls at each end by means of screws mounted in renewable safety bushes designed to fracture under a lower stress than would be required to fracture the housing in the event of the load increasing, from any cause, above a predetermined maximum, for instance, due to the consistency of the material being treated varying. In practice, considerable power is required to apply the requisite pressure by means of screws and also to open the rolls as is sometimes necessary when the machine is charged with a heavy load.

The main object of the present invention is to provide improved means for applying the requisite pressure to the rolls and for releasing or opening the same.

A further object of the invention is to provide means which will apply the requisite solid or rigid pressure to the rolls at a pressure below a predetermined maximum, governed by the normal load, but which will yield when the load exceeds said predetermined maximum and automatically reassert itself when the excess load is removed. Another object of the invention is to provide fluid pressure operated means for adjusting the rolls in which there is no follow up action, of the fluid under pressure, tending to cause the rolls to approach one another closer than the adjusted position.

According to the invention, the adjustable roll or spindle is journalled in bearings mounted in the framework or housing of the machine, so as to be capable of a sliding movement in the usual or other convenient manner. The adjustment is effected by hydraulic plungers, one for each bearing, and each located in a cylinder formed in one with the housing, or as a separate fitment adapted to be secured to the housing by a bayonet joint connection, after the manner of the usual safety bush, or by any other convenient means. A smaller cylinder communicates with the first and slidably mounted therein is a plunger which is reciprocated by a screw or other positively controlled means to increase or decrease the space common to both cylinders, whereby the water or other fluid in said cylinders is caused to apply the requisite stable pressure to the roller bearing, the relative sizes of the two cylinders determining the power required to actuate the same.

If desired, a by-pass conduit may be formed leading from one of the cylinders and controlled by a spring loaded valve or plunger adapted to yield when the predetermined maximum pressure is exceeded to permit a portion of the fluid in the cylinders to escape or enter an extension of the by-pass so that the bearing plunger is capable of retraction to accommodate the momentarily increased load. The by-pass conduits for both sets of cylinders may communicate with a common relief or momentum valve to obviate any possibility of unequalities in setting up the rolls. In like manner, the by-pass conduits of a series of machines may communicate with a common pipe having a single control relief valve so that the conditions obtained as to roll pressure may be the same for all machines.

The invention will be more particularly described by the aid of the accompanying drawings in which:—

Figure 1 is a sectional elevation of one end of a rubber mixing or like machine showing the improved means for applying and controlling the requisite pressure to the rolls, Figure 2 is a transverse section on the line 2, 2 of Figure 1, Figure 3 is a front view of a rubber mixing machine partly in section showing the bearings at both ends of the rolls controlled by a single relief valve.

In carrying the invention into effect according to one convenient method as illustrated, and as applied to a rubber mixing, grinding or like machine, the frame or housings $a$, $a$ are formed with horizontal guides $b$ to receive the roll bearings $c$. The front upright $a^1$ of each housing is bored and slotted to receive a horizontally disposed fitment or bushing $d$ formed with projections $d^1$ by means of which and the flange $d^2$, it may be secured in position somewhat after the manner of a safety bush to receive the usual adjusting screw. A cylinder $e$ is formed in the inner end of each fitment $d$ to receive a plunger $f$, the outer end of which bears against the respective roll bearing $c$. Concentric with said cylinder $e$ a second and smaller cylinder $g$ is formed to receive a plunger $h$ formed in one with or secured to a screwed spindle $h^1$ which engages screw-threads formed in the outer end of the fitment $d$. Said spindle $h^1$ is provided with a handle $h^2$ by means of which it may be rotated to reciprocate the integral or attached plunger $h$. The two cylinders $e$, $g$ are filled with water, oil, or other liquid which is forced from the smaller to the larger cylinder to force the plunger $f$ in the latter outwardly by the comparatively small power required to rotate the screwed spindle $h^1$. A small by-pass $i$ leads from the large cylinder to a spring controlled momentum valve or plunger $j$ loaded for a pressure slightly above the maximum pressure, the rolls $k$ are required to resist, and so that when said pressure is exceeded the valve or plunger $j$ will yield against the pressure of the adjustable spring $l$ and allow some of the fluid in the cylinder $e$ to escape and permit inward movement of the plunger $f$ and consequently an opening movement of the roll $k$, thereby obviating damage to the machinery. If the obstruction frees itself the roll automatically returns to the adjusted position, but in the event of the obstruction not passing the rolls, the pressure thereon is removed by turning back the handle $h^2$ which retracts the plunger $h$ and relieves the hydraulic pressure on the roll bearing $c$, transmitted through the plunger $f$, and as before stated, owing to the small size of the plunger $h$, only a slight effort is required to move said plunger notwithstanding the comparatively great pressure to which the roll is at the time being subjected.

As shown in Fig. 2 of the drawings, the packing gland $m$ acts as a stop to limit the movement of the follower $n$ acting under the compression spring $l$. This is the normal position of the momentum valve, and upon any movement of the piston $f$ away from the piston $h$, the pressure in the system is relieved without any tendency of the piston $j$ acting to maintain the pressure.

If desired, the by-pass $i$ in the fitments $d$ at both ends of the roll may lead to a common pipe fitted with a single spring loaded momentum valve or plunger to ensure equal pressure being applied to both ends of the rolls. Such an arrangement is shown in Figure 3 but instead of the plunger being fitted in one of the fitments $d$ it is shown mounted in a separate bracket $u$ secured to one of the housings $a$ and connected to one fitment $d$ by the pipe $v$ and to the fitment $d$ at the other end of the roll $k$ by means of the pipe $v^1$. This arrangement would also function to warn the attendant in the event of the consistency of the material being treated differing at one end of the rolls to the other. For instance, if in the course of masticating rubber one side was overmasticated, the rubber would run out thin at that side and thick at the other side, thereby indicating to the attendant that correction was necessary, indicators being provided if desired to indicate the relative position of the rolls. A suitable form of indicator for this purpose is indicated in dotted lines in Figure 1 in which a pointer $w$ is pivoted at $w^1$ to the stationary housing $a$ and moves over the calibrations $x$ when the lower end is moved by the roll bearing $c$ through the adjustable link $y$. If it is desired to control two or more machines by a common valve this is readily effected by branch piping as indicated in dotted lines at $v^2$ Figure 3.

The size of the small cylinder may be of any desired proportion relatively to the large cylinder, the size of the smaller cylinder being such as to allow the pressure to be easily applied and released by the attendant under all conditions.

By these means such machines are more easily and certainly adjusted and controlled and all liability to breakage obviated, whilst the peak load is lowered and consequently a less margin of power over that normally required to drive the machine needs to be provided.

Having now particularly described and ascertained the nature of my said invention and in what manner the same is to be performed, I declare that what I claim is:—

1. In machines wherein heavy duty rolls are employed, means to apply a predetermined pressure, in a fixed plane, to the rolls relatively to each other comprising manually operated means in combination with hydraulic amplifying gear, substantially as described.

2. In machines wherein heavy duty rolls are employed the provision and use of hydraulic amplifying gear interposed between the roll bearings and positively actuated means to apply and maintain pressure on said rolls, substantially as described.

3. In machines wherein heavy duty rolls are employed, the provision and use of manually operated means to adjustably apply and maintain the pressure on said rolls in combination with hydraulic power-amplifying means, through which said pressure is transmitted to the rolls, substantially as described.

4. In machines wherein heavy duty rolls are employed means for supplying pressure to the rolls comprising intercommunicating cylinders, a plunger slidably mounted in one cylinder, a second plunger of smaller cross-sectional area, slidably mounted in the other cylinder, and positive means to adjustably position said second plunger in its cylinder, substantially as described.

5. In machines wherein heavy duty rolls are employed, means for supplying pressure to the rolls comprising intercommunicating cylinders, a plunger slidably mounted in one of said cylinders, a second plunger of smaller cross-sectional area slidably mounted in the other cylinder and a hand operated screw to adjustably position said second plunger in its cylinder, substantially as described.

6. In machines wherein heavy duty rolls are employed, means for supplying pressure to the rolls comprising intercommunicating cylinders, a plunger slidably mounted in one of said cylinders, a second plunger of smaller cross-sectional area slidably mounted in the other cylinder and positive means to adjustably position said second plunger in its cylinder, together with a valve adapted to allow the escape of fluid from the said cylinders when the rolls are subjected to a pressure beyond a predetermined maximum, substantially as described.

7. In machines wherein heavy duty rolls are employed, means for supplying pressure to the rolls comprising intercommunicating cylinders, a plunger slidably mounted in one of said cylinders, a second plunger of smaller cross-sectional area slidably mounted in the other cylinder and positive means to adjustably position said second plunger in its cylinder, together with a momentum valve adapted to allow the escape of fluid from the said cylinders when the rolls are subjected to a pressure beyond a predetermined maximum and automatically force the fluid back into the said cylinders when the excess pressure on the rolls is removed.

8. In machines wherein heavy duty rolls are employed, a roll mounted for adjustment relatively to a complemental roll, bearings for said rolls means for applying pressure to the movable roll comprising differential hydraulic cylinders mounted on the machine framing at each side and with the larger diameter adjacent said bearings, plungers mounted in the large end of said cylinders and reacting against said roll bearings, a second set of plungers mounted in the small end of the cylinders, hand operated screws to position said small plungers, and means to connect both of said cylinders to a common momentum valve, substantially as described.

9. A rubber working machine comprising a frame, rolls mounted in said frames and one of said rolls being capable of movement towards and away from the other, hydraulic cylinders removably connected to the frame in line with the guides for the bearings of the movable roll, a plunger in each of said cylinders reacting against the respective roll bearing, a complemental smaller hydraulic cylinder communicating with each of the larger hydraulic cylinders, a plunger in each of said smaller cylinders, a screw for reciprocating each of said smaller plungers, and a momentum valve for each pair of interconnected cylinders substantially as described.

10. In a machine, a pair of cooperating rolls, and means to apply pressure to the rolls comprising a pair of communicating cylinders in alignment, fluid within said cylinders and therebetween, a plunger in one cylinder in engagement with the movable bearing block of one of said rolls, a plunger in the other of said cylinders, means to move the second mentioned plunger to apply pressure upon the fluid within the cylinders and therebetween and means for relieving excessive pressures in the fluid.

11. In a machine having cooperating rolls, one of said rolls being supported by movable bearings, means to apply pressure to the rolls comprising a pair of communicating cylinders, fluid within said cylinders and therebetween, a plunger in one of said cylinders in engagement with said movable bearing, a plunger in the other of said cylinders adapted to be moved therein to cause pressure upon the fluid in said cylinders and means for relieving excessive pressures in the fluid.

12. In a machine having cooperating rolls, one of said rolls being supported by movable bearings, means to apply pressure to the rolls comprising a pair of communicating cylinders, fluid in said cylinders and therebetween, a plunger in one cylinder in engagement with said movable bearing, a plunger in the other cylinder, and rotatable means adapted to force said second mentioned plunger against the fluid in and between said cylinders to adjust the pressure thereof against said first mentioned plunger.

13. In a machine having opposed rolls and a movable bearing block for one of said rolls, means for adjusting said movable bearing block comprising communicating cylinders, fluid in and between said cylinders, a plunger associated with said block and adapted to enter one of said cylinders, and a plunger in the other cylinder having a threaded end cooperating with threads in an opening in a stationary part of the machine, said second plunger being adapted upon rotation of said threaded end in one direction to advance into the cylinder to compress fluid therein, and thereby cause pressure to be exerted upon said first mentioned plunger, whereupon pressure is applied to said bearing blocks.

14. In a rolling machine in combination, opposed rolls, a movable bearing block for one of said rolls, fluid pressure operated means for adjusting the position of said movable bearing block and means for applying pressure to said fluid pressure operated means, and means for relieving said fluid pressure on said fluid pressure operated means upon movement of the rolls towards one another beyond the point of adjustment.

15. In a machine, a pair of rolls, a movable bearing block for one of said rolls and means for adjusting the position of said movable bearing block comprising an adjustable member adjacent said bearing block, means for retaining said member in an adjusted position and a fluid confined between said member and bearing block to transmit pressure from the former to the latter.

16. In a machine, a pair of rolls, a movable bearing block for one of said rolls, means for adjusting the position of said movable bearing block comprising an adjustable member adjacent said bearing block, means for retaining said member in an adjusted position and a fluid confined between said member and bearing block to transmit pressure from the former to the latter, and pressure relief means for said fluid.

17. In a machine having a frame, a movable bearing block mounted in said frame and adapted to support a roll or the like, means for adjusting the position of said bearing block comprising a bushing carried in the frame, said bushing being provided with a pair of intercommunicating cylinders, fluid within and between said cylinders, plungers in said cylinders, one of said plungers being in engagement with the bearing block, and means for adjusting the position of the other plunger to apply pressure on the fluid.

18. In a machine having a frame, a movable bearing block mounted in said frame and adapted to support a roll or the like, means for adjusting the position of said bearing block comprising a bushing in the frame, said bushing being provided with a pair of aligned intercommunicating cylinders, fluid within and between said cylinders, plungers in said cylinders, one of said plungers being in engagement with the bearing block, means for adjusting the position of the other plunger to apply pressure on the fluid, and pressure relief means for said fluid.

19. In a machine having a frame, a movable bearing block mounted in said frame and adapted to support a roll or the like, means for adjusting the position of said bearing block comprising a bushing carried in the frame, said bushing being provided with a pair of intercommunicating cylinders, fluid within and between said cylinders, plungers in said cylinders, one of said plungers being in engagement with the bearing block, and means for adjusting the position of the other plunger to apply pressure on the fluid, said last named plunger being smaller in diameter than said first named plunger.

20. In a machine having a frame, a movable bearing block mounted in said frame and adapted to support a roll or the like, means for adjusting the position of said bearing block comprising a bushing carried in the frame, said bushing being provided with a pair of intercommunicating cylinders of different diameters, fluid within and between said cylinders, plungers in said cylinders, the plunger of larger diameter being in engagement with the bearing block, and means for adjusting the position of the other plunger, said adjusting means being adapted to hold said plunger in its adjusted position.

21. In a machine having a frame, a movable bearing block mounted in said frame and adapted to support a roll or the like, means for adjusting the position of said bearing block comprising a bushing carried in the frame, said bushing being provided with a pair of intercommunicating cylinders of different diameters, fluid within and between said cylinders, plungers in said cylinders, the plunger of larger diameter being in engagement with said bearing block, and means for adjusting the position of the other plunger, including a member provided with threads cooperating with a threaded opening in said bushing.

22. In a machine having a frame, a movable bearing block mounted in said frame and adapted to support a roll or the like, means for adjusting the position of said bearing block comprising a bushing carried in the frame, said bushing being provided with a pair of intercommunicating cylinders, fluid within and between said cylinders, plungers in said cylinders, one of said plungers being in engagement with the bearing block, means for adjusting the position of the other plunger to apply pressure on the fluid, and a normally inactive pressure relief device adapted to relieve excessive pressures in said fluid.

23. In a machine having a frame, a movable bearing block mounted in said frame and adapted to support a roll or the like, means for adjusting the position of said bearing block comprising a bushing carried in the frame, said bushing being provided with a pair of intercommunicating cylinders, fluid within and between said cylinders, plungers in said cylinders, one of said plungers being in engagement with the bearing block, means for adjusting the position of the other plunger to apply pressure on the fluid, said last named plunger being smaller in diameter than said first named plunger, and a normally inactive pressure relief device adapted to relieve excessive pressures in said fluid.

24. In a machine having a frame, a movable bearing block mounted in said frame and adapted to support a roll or the like, means for adjusting the position of said bearing block comprising a bushing carried in the frame, said bushing being provided with a pair of intercommunicating cylinders of different diameters, fluid within and between said cylinders, plungers in said cylinders, the plunger of larger diameter being in engagement with the bearing block, means for adjusting the position of the other plunger, said adjusting means being adapted to hold said plunger in its adjusted position, and a normally inactive pressure relief device adapted to relieve excessive pressures in said fluid.

25. In a machine having a frame, a movable bearing block mounted in said frame and adapted to support a roll or the like, means for adjusting the position of said bearing block comprising a bushing carried in the frame, said bushing being provided with a pair of intercommunicating cylinders of different diameters, fluid within and between said cylinders, plungers in said cylinders, the plunger of larger diameter being in engagement with said bearing block, means for adjusting the position of the other plunger, including a member provided with threads cooperating with a threaded opening in said bushing, and a normally inactive pressure relief device adapted to relieve excessive pressures in said fluid.

26. In a machine wherein heavy duty rolls are employed, means for supplying pressure to the rolls comprising intercommunicating cylinders, a plunger slidably mounted in one of said cylinders, a second plunger of smaller cross-sectional area slidably mounted in the other cylinder, fluid within and between said cylinders, positive means to adjustably position said second plunger in its cylinder, and a normally inactive pressure relief device adapted to relieve excessive pressures in said fluid.

27. In a machine wherein heavy duty rolls are employed, a roll mounted for adjustment relatively to a complemental roll, bearings for said rolls, means for applying pressure to the movable roll comprising differential hydraulic cylinders mounted on the machine and with the larger diameter cylinders adjacent the bearings for said movable roll, plungers mounted in the large end of said cylinders and reacting against said movable roll bearings, a second set of plungers mounted in the small end of the cylinders, hand operated screws to position said small plungers, and a normally inactive pressure relief device connected to both of said cylinders, said device being adapted to relieve excessive pressures in the fluid.

28. In a machine having opposing rolls and a movable bearing block for one of said rolls, means for adjusting said movable bearing block, comprising intercommunicating cylinders, fluid within and between said cylinders, a plunger associated with said block and adapted to enter one of said cylinders, and a plunger in the other cylinder having a threaded end cooperating with threads in an opening in a stationary part of the machine, said second plunger being adapted upon rotation of said threaded end in one direction to advance into the cylinder to compress fluid therein and thereby cause pressure to be exerted upon said first mentioned plunger, and a normally inactive pressure relief device adapted to relieve excessive pressures in said fluid.

In testimony whereof he has signed his name to this specification.

ANDREW FRASER.